(12) United States Patent
Mizumoto

(10) Patent No.: US 8,531,763 B2
(45) Date of Patent: Sep. 10, 2013

(54) METHOD OF MANUFACTURING SCREEN AND PARTIAL SCREEN

(75) Inventor: Teruyuki Mizumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/426,367

(22) Filed: Mar. 21, 2012

(65) Prior Publication Data

US 2012/0243082 A1    Sep. 27, 2012

(30) Foreign Application Priority Data

Mar. 22, 2011   (JP) ................. 2011-062558

(51) Int. Cl.
    *G03B 21/60*    (2006.01)
(52) U.S. Cl.
    USPC .......................... 359/455; 359/443
(58) Field of Classification Search
    CPC ..................................... G03B 21/60
    USPC ................. 156/256; 359/455–456
    See application file for complete search history.

(56) References Cited

U.S. PATENT DOCUMENTS

| | | | | |
|---|---|---|---|---|
| 1,970,358 A * | 8/1934 | Bull et al. | ............ | 359/455 |
| 2,552,455 A * | 5/1951 | Pond | ............ | 359/459 |
| 2,974,566 A * | 3/1961 | Hurley | | |
| 3,502,389 A * | 3/1970 | Hilborn | ............ | 359/459 |
| 6,297,911 B1 * | 10/2001 | Nishikawa et al. | ............ | 359/619 |
| 6,325,880 B1 * | 12/2001 | Yamashita et al. | ............ | 156/209 |
| 6,373,634 B1 * | 4/2002 | Nishikawa | ............ | 359/619 |
| 6,404,555 B1 * | 6/2002 | Nishikawa | ............ | 359/619 |
| 6,411,439 B2 * | 6/2002 | Nishikawa | ............ | 359/619 |
| 6,898,015 B2 * | 5/2005 | Yoshikawa et al. | ............ | 359/619 |
| 7,061,682 B2 * | 6/2006 | Yamashita et al. | ............ | 359/619 |
| 7,157,015 B2 * | 1/2007 | Shimizu et al. | ............ | 216/24 |
| 7,255,806 B2 * | 8/2007 | Yoshimura et al. | ............ | 216/65 |
| 7,339,758 B2 * | 3/2008 | Shimizu et al. | ............ | 359/896 |
| 7,483,214 B2 * | 1/2009 | Yoshida et al. | ............ | 359/624 |
| 7,554,629 B2 * | 6/2009 | Miyao et al. | ............ | 349/95 |
| 7,589,898 B2 * | 9/2009 | Shigemura et al. | ............ | 359/619 |
| 7,859,750 B2 * | 12/2010 | Akiyama | ............ | 359/454 |
| 7,892,443 B2 * | 2/2011 | Shimizu et al. | ............ | 216/48 |
| 8,023,186 B2 * | 9/2011 | Katsuma et al. | ............ | 359/459 |
| 8,111,457 B2 * | 2/2012 | Akiyama | ............ | 359/443 |
| 8,197,926 B2 * | 6/2012 | Shinbo et al. | ............ | 428/178 |
| 2004/0156112 A1 * | 8/2004 | Nakajima | ............ | 359/619 |
| 2004/0211753 A1 * | 10/2004 | Shimizu et al. | ............ | 216/26 |
| 2005/0162747 A1 * | 7/2005 | Shimizu | ............ | 359/619 |
| 2005/0168817 A1 * | 8/2005 | Yamashita et al. | ............ | 359/487 |

(Continued)

FOREIGN PATENT DOCUMENTS

| JP | 6-011769 | 1/1994 |
|---|---|---|
| JP | 2005-283749 | 10/2005 |

(Continued)

*Primary Examiner* — Clayton E LaBalle
*Assistant Examiner* — Kevin Butler
(74) *Attorney, Agent, or Firm* — Workman Nydegger

(57) ABSTRACT

A screen is manufactured by a partial screen manufacturing process, a cutting process, and a bonding process. In the partial screen manufacturing process, partial screens adapted to constitute the screen and each having a plurality of lens elements arranged on a surface are manufactured. In the cutting process, the partial screens are each cut. In the bonding process, the partial screens are bonded to each other on the cutting surfaces of the partial screens thus cut. Thus, since the shape of the molding die for forming the screen can be made smaller, the manufacturing process can be simplified.

5 Claims, 13 Drawing Sheets

(56) References Cited

U.S. PATENT DOCUMENTS

| | | | |
|---|---|---|---|
| 2006/0072125 A1* | 4/2006 | Shimizu | 356/630 |
| 2006/0087742 A1* | 4/2006 | Shimizu | 359/619 |
| 2006/0203333 A1* | 9/2006 | Yamashita et al. | 359/456 |
| 2007/0238296 A1* | 10/2007 | Shimizu | 438/689 |
| 2008/0088921 A1* | 4/2008 | Yonekubo et al. | 359/459 |
| 2008/0218853 A1* | 9/2008 | El-Ghoroury et al. | 359/449 |
| 2009/0021828 A1* | 1/2009 | Shinbo et al. | 359/443 |
| 2009/0195872 A1* | 8/2009 | Yonekubo et al. | 359/459 |
| 2009/0225417 A1* | 9/2009 | Akiyama | 359/456 |
| 2010/0079861 A1* | 4/2010 | Powell | 359/449 |
| 2010/0092734 A1* | 4/2010 | Shinbo et al. | 428/178 |
| 2010/0157424 A1* | 6/2010 | Katsuma et al. | 359/455 |
| 2010/0259818 A1* | 10/2010 | Mikoshiba | 359/459 |
| 2011/0069385 A1* | 3/2011 | Katsuma et al. | 359/459 |
| 2011/0188114 A1* | 8/2011 | Shinbo et al. | 359/459 |
| 2011/0194178 A1* | 8/2011 | Katsuma et al. | 359/459 |
| 2012/0229895 A1* | 9/2012 | Shinbo et al. | 359/448 |

FOREIGN PATENT DOCUMENTS

| | | | |
|---|---|---|---|
| JP | 2008-116911 | | 5/2008 |
| JP | 2009-192871 | | 8/2009 |
| JP | 2010-184425 | * | 8/2010 |
| JP | 2010-186115 | * | 8/2010 |
| JP | 2010-190957 | | 9/2010 |

* cited by examiner

METHOD OF MANUFACTURING SCREEN AND PARTIAL SCREEN

BACKGROUND

1. Technical Field

The present invention relates to a method of manufacturing a screen and a partial screen.

2. Related Art

In the past, there has been known a screen provided with a plurality of microscopic lens elements arranged on an entrance surface where the light projected from a projector enters (see, e.g., JP-A-2009-192871 (Document 1)).

The screen described in Document 1 has a plurality of lens elements each having a concave or convex shape, and each of the lens elements is provided with a reflective film formed in an area to which the light from a projector located below is input. By reflecting the light forming an image toward the observer using such lens elements, the observer can visually recognize the image.

Incidentally, such a screen can be manufactured by, for example, directly forming the concave lens elements on a screen substrate using an etching process or the like. Further, in the case of manufacturing a screen having the convex lens elements, the screen can be manufactured by manufacturing a molding die formed to have a concave lens mold corresponding to the lens elements using a similar method, and then transferring the lens mold to the screen substrate. Alternatively, it is also possible to manufacture a final die having a convex lens mold from the molding die, and then manufacture the screen having the concave lens elements using the final die.

However, in the case of manufacturing the screen using the die (the molding die and the final die), since the die grows in size as the screen to be manufactured grows in size, and handling of the die becomes troublesome, and further, the facility used to manufacture the die also grows in size, there arises a problem that the manufacturing process is apt to become cumbersome and complicated. Therefore, the method capable of simplifying the manufacture and handling of the die to thereby simplify the manufacturing process of the screen has been being demanded.

SUMMARY

An advantage of some aspects of the invention is to provide a method of manufacturing a screen capable of simplifying the manufacturing process, and a partial screen.

An aspect of the invention is directed to a method of manufacturing a screen including manufacturing a plurality of partial screens constituting the screen, and each having a plurality of lens elements arranged on a surface, cutting each of the partial screens, and bonding the partial screens to each other on cutting surfaces of the partial screens cut in the cutting.

It should be noted that the lens element denotes a structure having, for example, a curved surface having a concave shape or a convex shape, and reflecting the incident light (e.g., image light) toward the front of the screen.

According to this aspect of the invention, a plurality of partial screens is bonded to each other to thereby manufacture one screen. According to this configuration, in the case of manufacturing the partial screen using a die, the size of the die for forming the partial screen can be made smaller than the size of the die corresponding to the screen to be manufactured. Therefore, even in the case of manufacturing a relatively large size screen, the manufacture and treatment of the die can be simplified compared to the case of manufacturing the screen from a single die, and as a result, the manufacturing process of the screen can be simplified.

Here, in the case of manufacturing the screen using the die, generally, it is not achievable to form the lens element in the periphery of the screen due to the production problems and so on. Therefore, in the case of directly bonding such screens as the partial screens, it is not achievable to form the lens elements in the bonding part.

In contrast, according to the aspect of the invention, since each of the partial screens is cut in the cutting process, and then the partial screens are bonded to each other on the cutting surfaces, the lens elements can also be formed in the bonding part.

In the aspect of the invention, it is preferable that in the manufacturing, the partial screens each having a plurality of lens elements, each having one of a concave shape and a convex shape, arranged on the surface are manufactured, and the cutting includes one of cutting each of the partial screens along a ridge line portion of the lens element as a cutting region with respect to the lens element having the concave shape, and cutting each of the partial screens along a contour portion of the lens element as a cutting region with respect to the lens element having the convex shape.

It should be noted that the ridge line portion denotes the connection section between the lens elements each having the concave shape, and in the case of the lens element composed of the curved surface having the concave shape, the most projecting part between the lens elements becomes the ridge line portion. Further, the contour portion denotes the edge portion of the lens element having the convex shape, and in the case of the lens element composed of the curved surface having the convex shape, the most hollowing part between the lens elements becomes the contour portion.

Here, by simply bonding the partial screens to each other, there is a possibility that the trace of the bonding becomes conspicuous, and the image displayed on the screen to be manufactured is deteriorated.

In contrast, according to the above configuration, since the partial screens are cut along either one of the ridge line portion of the lens element having the concave shape and the contour portion of the lens element having the convex shape and bonded to each other on the cutting surfaces, it is possible to make it difficult to put the trace of the bonding in the lens element of the screen to be manufactured. Therefore, the trace of the bonding can be made inconspicuous. Further, according to the process described above, since it becomes difficult to put the trace of the bonding in the effective reflecting area for effectively reflecting the incident light toward the observer in the screen to be manufactured, the deterioration in the image to be projected and displayed on the screen can be prevented.

In the aspect of the invention, it is preferable that the lens elements are formed adjacent to each other, the plurality of lens elements includes first lens elements, and second lens elements having curvature equal to curvature of the first lens elements, and disposed so as to have a center-to-center distance with adjacent one of the first lens elements longer than a center-to-center distance between two first lens elements adjacent to each other, and in the cutting, the partial screens are cut at a position shifted from the cutting region toward a center of the first lens element.

According to this configuration of the invention, the cutting region of either one of the ridge line portion and the contour portion becomes the position distant from the planned cutting position toward the second lens element. Thus, even in the case in which the actual cutting position is shifted toward the second lens element side due to the accuracy error or the like, either one of the ridge line portion and the contour portion can appropriately be formed, and therefore, the bonding part can be made inconspicuous.

In the aspect of the invention, it is preferable that in the manufacturing, the partial screens each having a plurality of lens elements, each having one of a concave shape and a convex shape, arranged on the surface are manufactured, and the cutting includes one of cutting each of the partial screens along a bottom portion of the lens element with respect to the lens element having the concave shape, and cutting each of the partial screens along a top of a head of the lens element with respect to the lens element having the convex shape.

Here, in the case of cutting and then bonding the partial screens at the portion (the portion at a large angle with the surface of the partial screen in the lens mold) having a large tilt of the lens mold, if the actual cutting position is shifted due to the accuracy error and so on, a step occurs in the bonding part. In the case of manufacturing the screen by bonding the partial screens cut in such a manner, there is a possibility that the step portion appears as a line, or a shadow is created by the step to thereby deteriorate the image displayed when displaying an image on the screen.

In contrast, according to the above configuration, the partial screens are cut and then bonded in either of the bottom portion and the top of the head where the angle with the surface of the partial screen is the smallest in the lens mold. According to this configuration, even in the case in which the actual cutting position is shifted from the planned cutting position, the step described above can be prevented from occurring, and as a result, it can be prevented that the step is caused in the bonding part to thereby deteriorate the image displayed. Further, it is possible to provide a large margin with respect to the step described above due to the accuracy error, and thus the yield in manufacturing the screen can be enhanced.

Further, in the case in which the central portion of the lens element corresponds to either of the bottom portion and the top of the head, the distance from the planned cutting position to the peripheral portion of the lens element can be made even and long. Therefore, there can be assured the sufficient margin for preventing that the cutting position is shifted from the planned cutting position and the lens element adjacent thereto is cut when cutting the partial screens.

Further, in this case, by bonding the partial screens to each other, a part of the lens element remaining in each of the partial screens can be combined to thereby form one whole lens element.

In the aspect of the invention, it is preferable that in the manufacturing, the partial screens each having a lens column including a plurality of the lens elements linearly arranged on the surface are manufactured, and in the cutting, the partial screens are cut at a position of the plurality of the lens elements forming the lens column.

According to the above configuration, since each of the partial screens can be cut linearly along the lens column, the cutting process can be simplified.

Another aspect of the invention is directed to a partial screen adapted to constitute a screen adapted to display an image corresponding to an incident light including a lens column having a plurality of lens elements each adapted to emit the light, linearly arranged on a surface.

Here, a screen is formed by bonding a plurality of members, and the partial screen denotes the member used when forming the screen.

In this aspect of the invention, substantially the same advantages as in the method of manufacturing a screen described above can be obtained.

Specifically, by forming one screen by bonding a plurality of partial screens to each other, in the case of manufacturing the partial screen using a die, the size of the die for forming the partial screen can be made smaller than the size of the die corresponding to the screen to be manufactured. Therefore, even in the case of manufacturing a relatively large size screen, the manufacture and treatment of the die can be simplified compared to the case of manufacturing the screen from a single die, and as a result, the manufacturing process of the screen can be simplified.

Further, according to this aspect of the invention, the lens column having the lens elements linearly arranged is formed on the surface of the partial screen. According to this configuration, by cutting the plurality of partial screens linearly along the lens column, and then bonding them on the respective cutting surfaces, the screen having the lens elements formed in the bonding part can easily be manufactured.

As described above, in the case of cutting and then bonding the partial screens, by cutting the partial screens along, for example, either of the ridge line portion and the contour portion of each of the lens elements, the bonding part can be made inconspicuous as described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.

Overall Configuration of Screen

Figure 1:
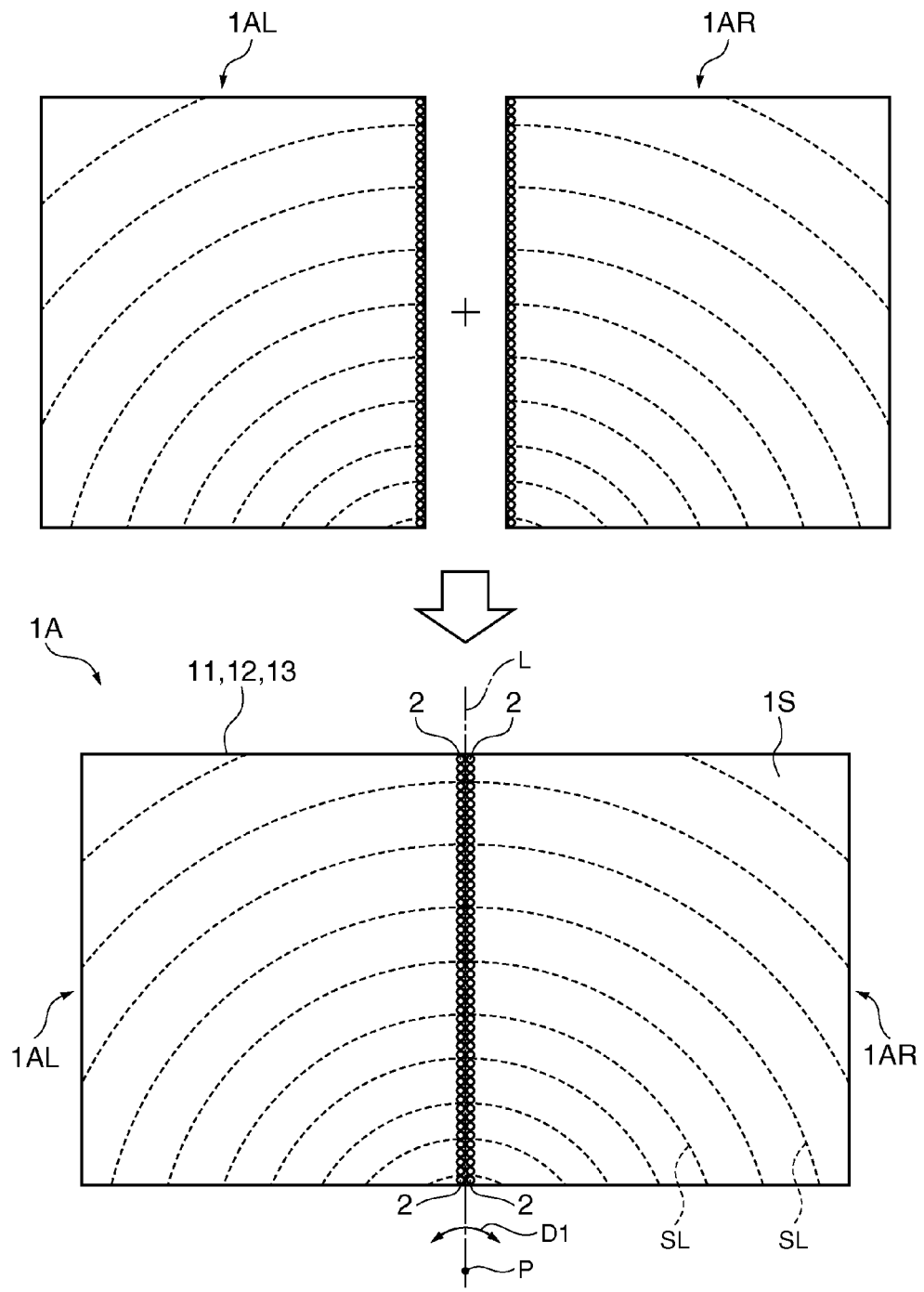
FIG. 1 is front view showing a configuration of a screen according to a first embodiment of the invention.

FIG. 1 is a front view showing a configuration of a screen 1A according to the present embodiment.

As shown in FIG. 1, the screen 1A according to the present embodiment is formed to have a roughly rectangular planar shape, and is for reflecting an image, which is obliquely input from a projector (not shown) disposed on the lower front side of the screen 1A (on the lower near side in the drawing view of FIG. 1), mainly to the front side of the screen 1A to thereby display the image. It should be noted that although the details will be described later, the screen 1A is composed of partial screens 1AL, 1AR as shown in FIG. 1.

The screen 1A is provided with a configuration having a plurality of lens elements 2 arranged on a surface 1S (a surface on the front side). Specifically, the screen 1A has the lens elements 2 arranged along an imaginary straight line L passing through a rough center thereof in the width direction.

The lens elements 2 are each formed of a curved surface having a concave shape, and are for reflecting the image from the projector toward the front side. The lens elements 2 are formed along imaginary reference lines SL partially forming concentric circles (including circles and ellipses) centered on a reference point P on the straight line L. It should be noted that in FIG. 1, some of the reference lines SL are shown as examples.

Figure 2:
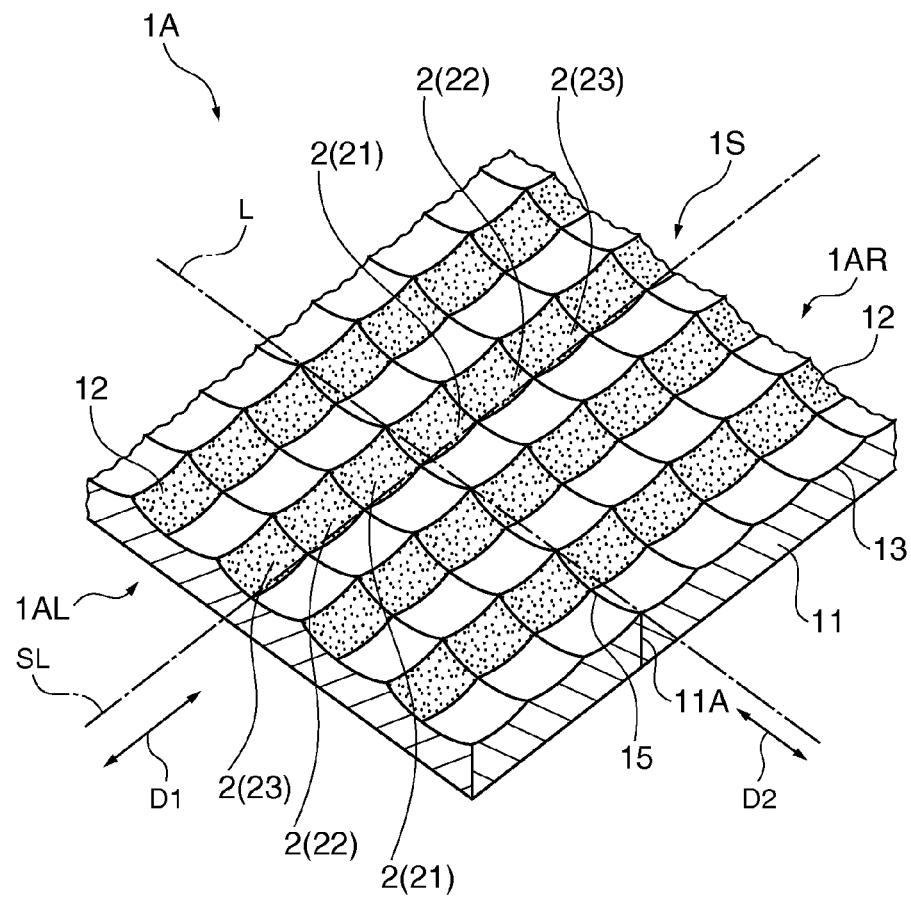
FIG. 2 is a cross-sectional view showing a part of a surface of the screen according to the embodiment in an enlarged manner.

FIG. 2 is an enlarged perspective view partially showing the surface 1S of the screen 1A.

As shown in FIG. 2, the lens elements 2 are formed so as to be adjacent to each other.

Further, the lens elements 2 are arranged on the surface 1S so that the straight line L passes between the lens elements 2. In the detailed description, the lens elements 2 are arranged symmetrically about the straight line L, and are formed so that a ridge line portion 15 of each of the lens elements 2 (lens elements 21) adjacent to each other on both sides of the straight line L coincides with the straight line L in the front view. It should be noted that the ridge line portion 15 is the most projecting portion between the concave lens elements 2.

Specifically, the lens elements 2 are configured to have a regular arrangement and a regular shape in a first direction D1 as a direction along the reference lines SL. It should be noted that although in the present embodiment there is described one having the lens elements 2 each formed of the curved surface having a concave shape arranged so as to have equal intervals and the same shapes (the shapes with the curved surfaces having the same curvature) in the first direction D1 as an example, the shapes of these lens elements 2, and the intervals and shapes thereof in the first direction D1, and so on are not limited thereto.

The curved surface having the concave shape constituting the lens element 2 has a reflective film 12 on the upper side (the upper side in the drawing view of FIG. 1). Thus, the surface 1S of the screen 1A has a function of reflecting the light (the light forming an image), which has input from the projector, toward the front side. It should be noted that the lower side of the curved surface is formed to have black color or the like to thereby have a light absorbing property. Thus, the surface 1S of the screen 1A also has a function of hardly reflecting light such as the light of a fluorescent lamp mounted on the ceiling or the sunlight toward the front side.

It should be noted that the surface 1S of the screen 1A is provided with a protective film 13 for protecting the lens elements 2 if necessary.

As described above, the screen 1A described hereinabove is manufactured by bonding the partial screen 1AL constituting the left side in the width direction from the straight line L as the boundary, and the partial screen 1AR constituting the right side in the width direction.

Method of Manufacturing Screen

The screen 1A described above is manufactured by the manufacturing method described below. The manufacturing method includes a mother die manufacturing process, a molding die manufacturing process, and a screen manufacturing process in the sequence of the processes.

Hereinafter, each of the processes will be explained.

Mother Die Manufacturing Process

FIGS. 3A through 3F are schematic diagrams showing the mother die manufacturing process and the molding die manufacturing process. Specifically, FIGS. 3A through 3F show the manufacturing process of the mother die 3A (3AL) and the molding die 5A (5AL) corresponding to the partial screen 1AL. It should be noted that in FIGS. 3A through 3F the member to be the die used for molding is illustrated so as to be located below the member to be molded by the die in order to make the explanation easy to understand. The same applies to the drawings described below.

The mother die manufacturing process is a process of manufacturing the mother die 3AL for manufacturing the partial screen 1AL, and has a mask formation procedure, a hole formation procedure, a recess formation procedure, and an elimination procedure in the sequence of the processes.

Figure 3A:
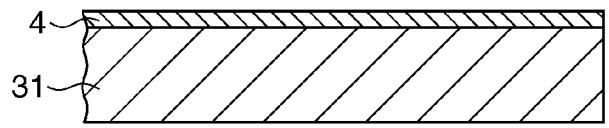
FIG. 3A is a schematic diagram showing a mother die manufacturing process (a mask formation procedure) in the embodiment.

In the mask formation procedure, firstly, as shown in FIG. 3A, a mask layer 4 is formed on a flat surface of a material substrate 31 such as a glass plate. The material of the mask layer 4 can arbitrarily be selected in accordance with the process thereafter performed, and in the present embodiment, the mask layer 4 has a three-layered structure composed of a chromium oxide layer, a chromium layer, and a chromium oxide layer.

Figure 3B:
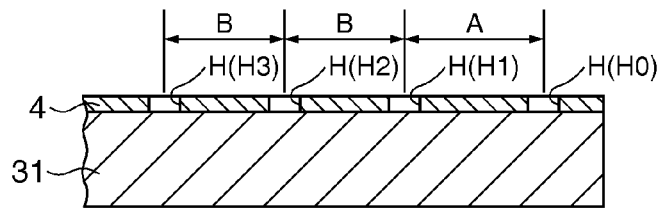
FIG. 3B is a schematic diagram showing the mother die manufacturing process (a hole formation procedure) in the embodiment.

In the hole formation procedure, as shown in FIG. 3B, a plurality of holes H is provided to the mask layer 4 by laser irradiation or the like. The holes H are for providing lens molds 32 each having a concave shape corresponding to the lens element 2 of the partial screen 1AL described above to the material substrate 31, and are formed at the positions corresponding to the design formation positions of the lens elements 2.

Specifically, in the hole formation procedure, although not shown in the drawings, the holes for trial shot are formed in sequence from an end portion of the mask layer 4, and then, as shown in FIG. 3B, the holes H0, H1, H2, H3, . . . are formed. The hole H0 is a preparatory hole for forming the holes H1, H2, and H3. The holes H1, H2, H3, . . . correspond respectively to the lens elements 21, 22, 23, . . . shown in FIG. 2. In other words, the holes H1, H2, H3, . . . are for forming the lens molds 32 for forming the lens elements 21, 22, 23, . . . shown in FIG. 2. It should be noted that although an arrangement of one predetermined line along the first direction D1 is explained here, the configuration is substantially the same in other lines.

In the hole formation procedure, the holes H in the same line in the first direction D1 are all formed to have the same diameter. Further, the holes H0, H1 in the lines are arranged linearly along the direction roughly perpendicular to the first direction D1. It should be noted that the direction in which the holes H0, H1 are formed is the same as a second direction D2 (FIG. 2) along the straight line L in the screen 1A described above. Further, the holes are formed to have a positional relationship in which the distance A between the centers of the hole H0 and the hole H1 is larger than a distance B between the centers of the holes H2, H3 adjacent to the hole H1. The relationship between the distances A, B will be described later.

Figure 3C:
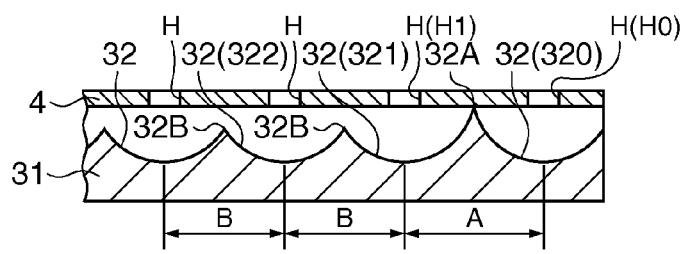
FIG. 3C is a schematic diagram showing the mother die manufacturing process (a recess formation procedure) in the embodiment.

In the recess formation procedure, an etching liquid (not shown) such as buffered hydrofluoric acid is injected in the holes H thus formed in the hole formation procedure to thereby provide recesses corresponding respectively to the holes H to the material substrate 31. Thus, the areas of the material substrate 31 corresponding to the respective holes H are corroded toward the lower part of the material substrate 31, and at the same time, the material substrate 31 is corroded so that each of the concave curved surfaces extends outward from the periphery of the corresponding hole H. Therefore, as shown in FIG. 3C, the material substrate 31 is provided with the lens molds 32 (the lens molds 320, 321, 322, . . . ) each formed of the curved surface having a concave shape.

Here, the holes H are formed in the positional relationship described above, the distances between the centers of the lens molds 32 have the same positional relationship of the holes H described above. Thus, the ridge line portion 32A of the mold of the second lens mold 321 (the lens mold 32 formed under the hole H1) connected to the first lens mold 320 (the lens mold 32 formed under the hole H0) is formed higher than the ridge line portions 32B of other molds in the same line.

Figure 3D:
FIG. 3D is a schematic diagram showing the mother die manufacturing process (an elimination procedure) in the embodiment.

In the elimination procedure, as shown in FIG. 3D, the mask layer 4 and the etching liquid are removed from the material substrate 31 provided with the plurality of lens molds 32, and then the material substrate 31 is rinsed out and then dried.

Thus, the mother die 3AL corresponding to the partial screen 1AL is manufactured. Further, by passing through a similar procedure, the mother die 3A corresponding to the partial screen 1AR is also manufactured. It should be noted that since the mother die 3A corresponding to the partial screen 1AR can be manufactured by applying the manufacturing process of the mother die 3AL, drawing and detailed explanation will be omitted here. The same applies to the molding die manufacturing process and the screen manufacturing process described below.

Molding Die Manufacturing Process

The molding die manufacturing process is a process for manufacturing the molding die 5A from the mother die 3A.

Figure 3E:
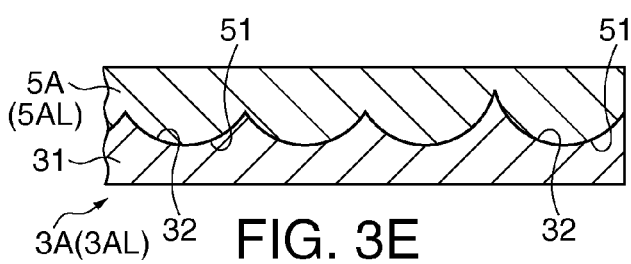
FIGS. 3E and 3F are schematic diagrams showing a molding die manufacturing process in the embodiment.

As shown in FIG. 3E, in the molding die manufacturing procedure, the lens molds 32 of the mother die 3AL are transferred to thereby provide lens molds 51 each having a convex shape to the molding die 5AL. As the material of the molding die 5AL, those hard to be deflected and injured, and specifically, there can be cited a variety of metals, a variety of resin materials represented by plastic, and so on. For example, the molding die 5AL can be formed by injection of resin such as silicone resin besides electrocasting of a metal material such as nickel.

Figure 3F:
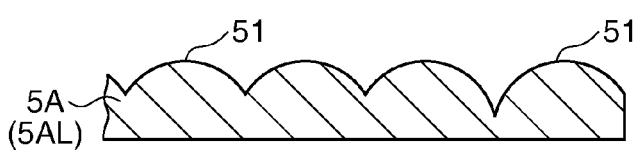

Further, by separating the molding die 5AL provided with the lens molds 51 from the mother die 3AL, the molding die 5AL shown in FIG. 3F is manufactured. Further, in a similar manner, the molding die 5A corresponding to the partial screen 1AR is also manufactured.

Screen Manufacturing Process

FIGS. 4A through 4E are schematic diagrams showing the screen manufacturing process.

The screen manufacturing process has a partial screen manufacturing procedure, a reflective film formation procedure, a cutting procedure, a bonding procedure, and a protective film formation procedure.

Figure 4A:
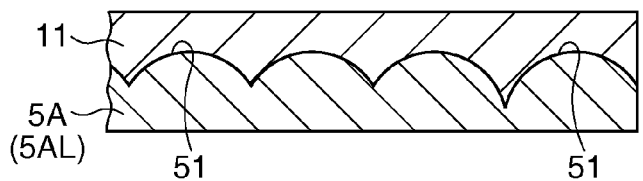
FIGS. 4A and 4B are schematic diagrams showing a screen manufacturing process (a partial screen manufacturing procedure) in the embodiment.
Figure 4B:

In the partial screen manufacturing procedure, the lens molds 51 of the molding die 5AL described above are transferred to a screen substrate 11 as shown in FIG. 4A, and then the screen substrate 11 after the transfer is separated from the molding die 5AL to thereby provide the lens elements 2 to the screen substrate 11 as shown in FIG. 4B. It should be noted that the material of the screen substrate 11 can be anything generally used as a screen material, and is not particularly limited. Specifically, as the material there can be cited a resin material such as vinyl chloride resin (polyvinyl chloride (PVC)) or silicone resin.

Figure 4C:
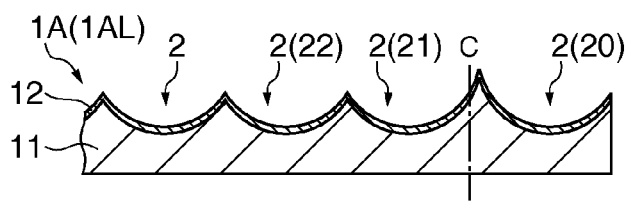
FIG. 4C is a schematic diagram showing the screen manufacturing process (a reflective film formation procedure and a cutting procedure) in the embodiment.

In the reflective film formation procedure, firstly, a surface treatment is performed so that the surface 1S has a light absorbing property by performing, for example, coating of the entire area of the screen substrate 11 where the lens elements 2 are formed with black paint. Subsequently, a film member made of aluminum or the like is deposited by oblique evaporation on the surface where the lens elements 2 are formed as shown in FIG. 4C, the reflective film 12 is provided to a partial area of each of the lens elements 2 as shown in FIG. 2. It should be noted that the surface treatment can be performed after forming the reflective film 12. By using a material provided with the light absorbing property as the material of the screen substrate 11, the surface treatment can be eliminated. Further, as the method of forming the reflective film 12, any method well known to the public can be adopted besides the evaporation, and the formation of the reflective film 12 can also be performed by, for example, coating the surface with silver paint.

Figure 5A:
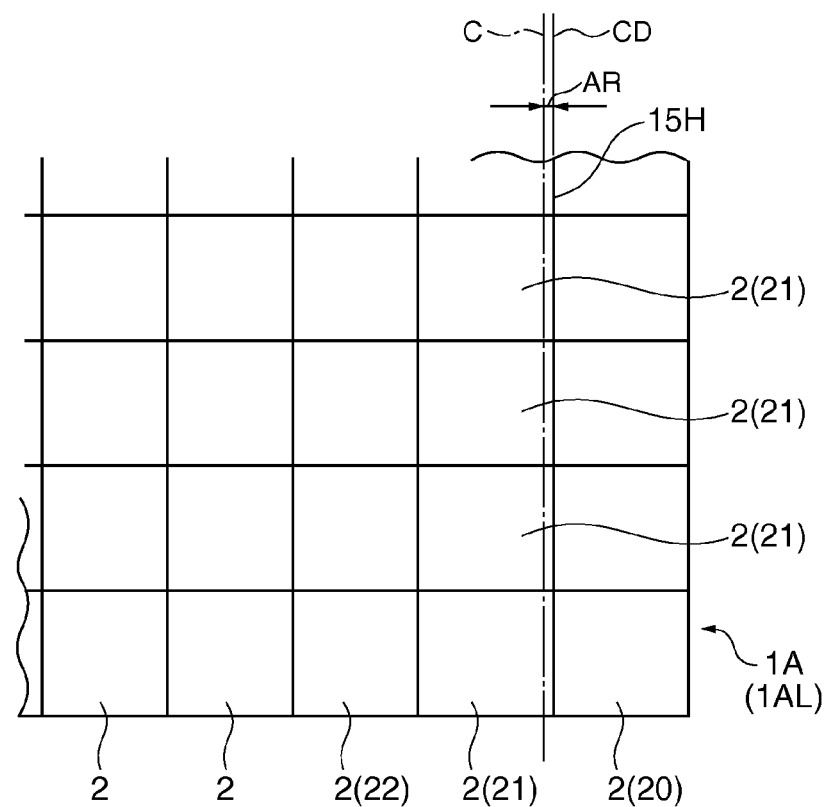
FIG. 5A is a plan view for explaining a planned cutting region of the partial screen in the embodiment.
Figure 5B:
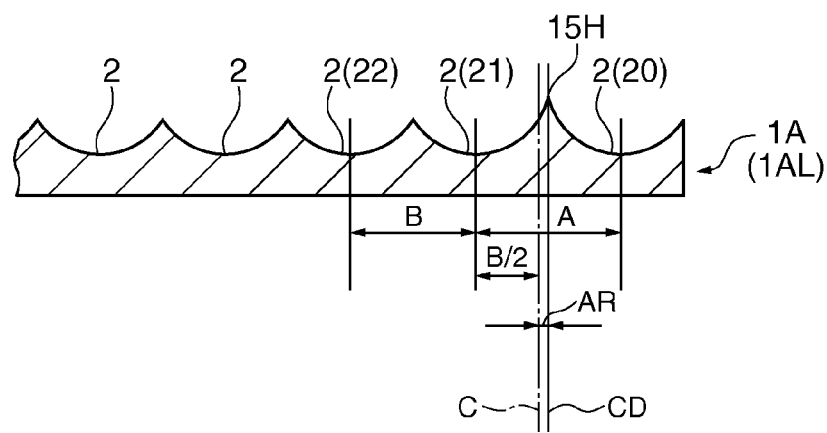
FIG. 5B is a side view for explaining the planned cutting region of the partial screen in the embodiment.

FIGS. 5A and 5B are diagrams for explaining a planned cutting region of the partial screen 1AL. FIG. 5A is a plan view of the planned cutting region, and FIG. 5B is a side view of the planned cutting region.

It should be noted that in the lens elements 2 shown in FIGS. 5A and 5B, the lens elements 20 through 22 correspond respectively to the lens molds 320 through 322 of the mother die 3A shown in FIG. 3C.

In the cutting procedure, as explained below, the partial screen 1AL obtained by the partial screen manufacturing procedure is cut at a planned cutting position C along a linear ridge line portion 15H between the lens element 21 as a first lens element and the lens element 20 as a second lens element. In other words, the partial screen 1AL is cut along a column (a lens column) of the lens elements 21. It should be noted that the first lens elements denote the lens elements 21, 22, 23, . . . having equal lens intervals of an interval B, and the second lens elements denote the lens elements 20 having a center-to-center distance (an interval A) with the first lens elements larger than the interval B.

Here, the positional relationship between the lens elements 2 formed by transferring the lens molds 51 of the molding die 5A is the same as the positional relationship between the holes H described above. In other words, the interval A between the centers of the lens element 21 and the lens element 20 is larger than the interval B. In the detailed description, the interval A between the center of the lens element 21 to which the planned cutting position C is set and the center of the lens element 20 adjacent to the lens element 21 in the same line in the first direction D1 and becoming unnecessary by cutting is set larger than the interval B between the center of the lens element 21 and the center of the lens element 22 adjacent to the lens element 21 on the opposite side to the lens element 20 in the same line in the first direction D1.

Further, in the present embodiment, the planned cutting position C is set to the position, which is distant from the center position of the lens element 21 in the direction from the lens element 21 toward the lens element 20 as much as a half (B/2) of the interval B between the centers of the lens element 21 and the lens element 22.

Thus, it results that, as shown in FIGS. 5A and 5B, the ridge line portion 15H between the lens elements 20, 21 is located at the position CD more distant from the center of the lens element 21 than the planned cutting position C in the direction from the lens element 21 toward the lens element 20. The range AR from the planned cutting position C to the position CD corresponds to the cutting amount of the lens element 20 side with respect to the planned cutting position C. For example, the cutting amount is set to 5 through 100 μm.

If the cutting is performed at the planned cutting position C, it results that in the partial screen 1AL the shapes of the respective lens elements 2 coincide with each other.

It should be noted that similarly to the partial screen 1AL, the partial screen 1AR is also manufactured, and then cut.

Figure 4D:
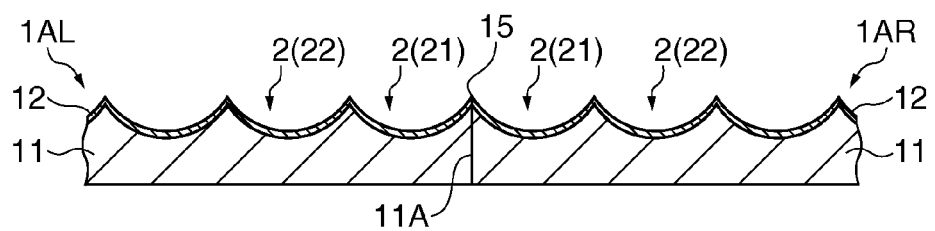
FIG. 4D is a schematic diagram showing the screen manufacturing process (a bonding procedure) in the embodiment.

In the bonding procedure, as shown in FIG. 4D, the partial screens 1AL, 1AR are bonded to each other on the respective cut surfaces 11A. It should be noted that when bonding them to each other, the bonding is performed after appropriately positioning them so that the respective lines of the partial screens 1AL, 1AR along the first direction D1 are aligned to each other. Regarding the bonding method, it is preferable to bond the partial screens 1AL, 1AR to each other directly or via an adhesive having optical characteristics roughly the same as those of the partial screens 1AL, 1AR. Thus, the bonding part can be prevented from being conspicuous. Here, as the adhesive, a known material such as silicone, epoxy, or acrylic can be selected.

For example, as the case of bonding them directly, there can be cited the case of melting the bonding part with heat to thereby bond the partial screens 1AL, 1AR to each other. In this case, the melting section with the heat can be made smaller. Further, there can also be cited the case of coating the bonding parts of the partial screens 1AL, 1AR with an adhesive to thereby perform butt bonding.

Figure 4E:
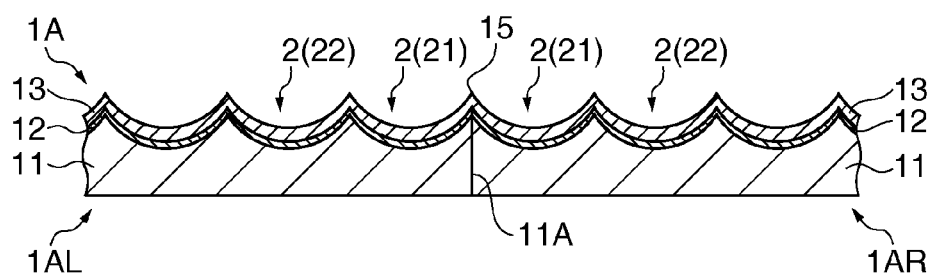
FIG. 4E is a schematic diagram showing the screen manufacturing process (a protective film formation procedure) in the embodiment.

In the protective film formation process, as shown in FIG. 4E, the protective film 13 having a light transmissive property is formed on the entire area provided with the reflective film 12 in the partial screens 1AL, 1AR bonded each other.

According to the process described above, the screen 1A having the lens elements 2 shown in FIG. 1 is manufactured.
Error in Cutting Partial Screen Here, the accuracy error can occur in the formation of the lens molds 32 in the mother die manufacturing process described above, in the formation of the lens elements 2 and the cutting of the partial screens 1AL, 1AR in the partial screen manufacturing process, and so on. If the accuracy error occurs, the shapes of the bonding parts of the partial screens 1AL, 1AR vary.

Hereinafter, the variation in the shapes of the bonding parts due to the accuracy error and the influence of the variation will be explained using a comparative example.

Figure 6A:
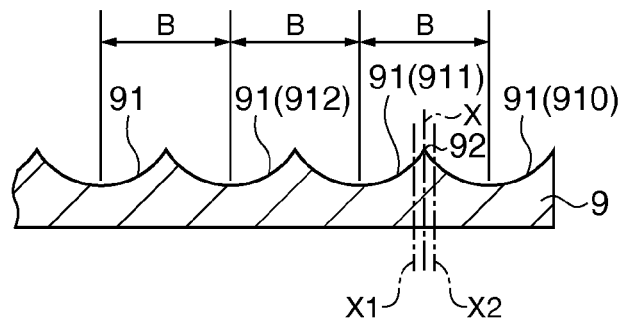
FIG. 6A is a side view showing a cutting position of a partial screen in a comparative example.
Figure 6B:
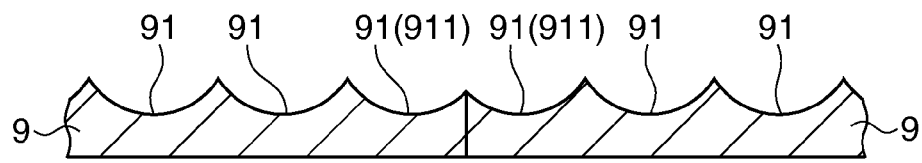
FIGS. 6B and 6C are side views showing a bonding part of a partial screen in the comparative example.
Figure 6C:
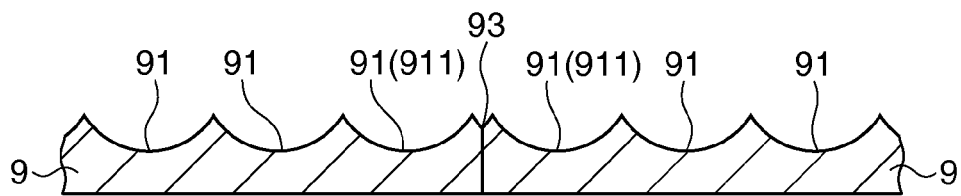

FIGS. 6A through 6C are diagrams for explaining a bonding part of the partial screens 9 in a comparative example.

As shown in FIG. 6A, in the partial screen 9 in the comparative example, the intervals between the centers of the lens elements 91 in the same line in the first direction D1 described above are all equal to the interval B. In the partial screen 9, assuming that the ridge line portion 92 of a lens element 911 adjacent to a lens element 910 is a planned cutting position X, and the partial screen 9 is cut at the planned cutting position X, the shape of each of the lens elements 91 after the bonding becomes an appropriate shape, and becomes to have no influence on the image to be displayed on the screen.

Further, even in the case in which the partial screen 9 is cut at a position X1 shifted from the planned cutting position X toward the lens element 912 side, as shown in FIG. 6B, the projecting section between the lens elements 911 in the bonding part is only somewhat lowered, and there is no substantial influence on the image displayed on the screen.

However, in the case in which the partial screen 9 is cut at a position X2 shifted from the planned cutting position X toward the lens element 910 side, a small recessed section 93 is formed in the bonding part as shown in FIG. 6C. Therefore, the trace of the bonding part becomes conspicuous, and in addition, since the recessed section 93 does not have the enough area for forming the effective reflecting area for appropriately reflecting the incident light toward the front side of the screen, the recessed section 93 diffuses the incident light, and thus causes dazzle when observing the image projected.

FIGS. 7A through 7D are diagrams for explaining a bonding part of the partial screens 1AL, 1AR according to the present embodiment.

Figure 7A:
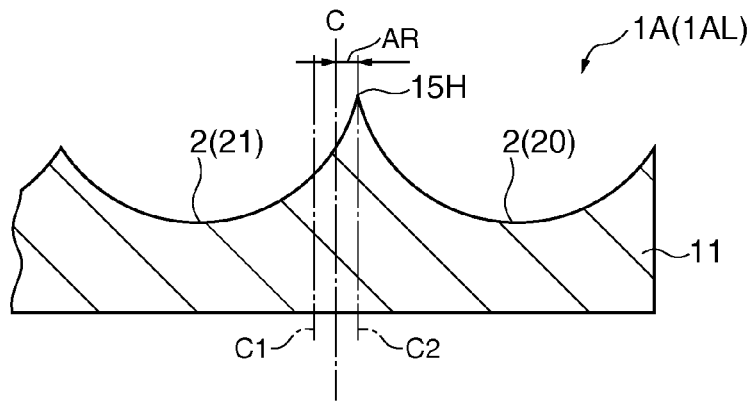
FIG. 7A is a side view showing a cutting position of the partial screen in the embodiment.

In contrast to the comparative example described above, according to the present embodiment, as shown in FIG. 7A, the partial screens 1AL, 1AR are cut at the planned cutting position C described above.

Figure 7B:
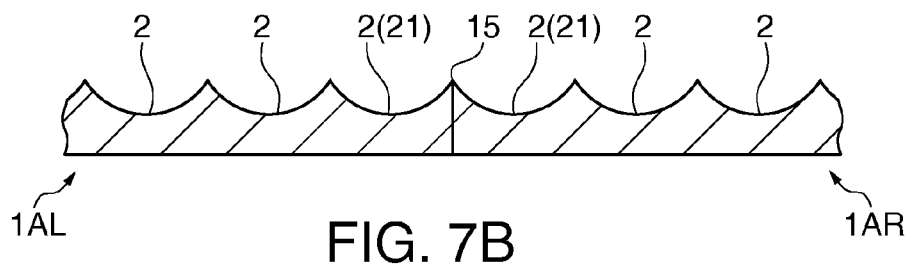
FIGS. 7B through 7D are side views showing a bonding part of the partial screen in the embodiment.

According to this configuration, in the case in which the partial screens 1AL, 1AR are cut without shifting the cutting position from the planned cutting position C, the screen 1A has the lens elements 2 each having an appropriate shape as shown in FIG. 7B, and the bonding part can be made inconspicuous even when displaying the image on the screen 1A.

Figure 7C:
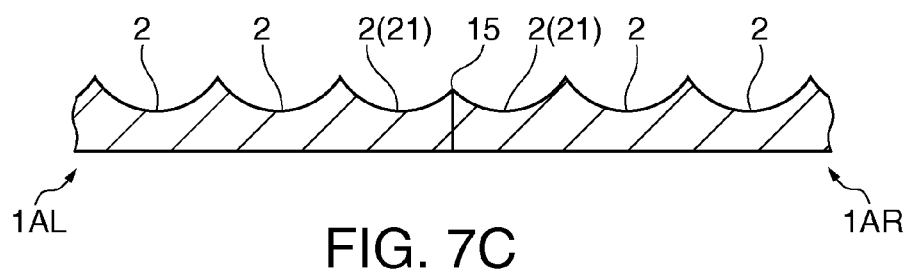

Further, even in the case in which the partial screens 1AL, 1AR are cut at a position C1 shifted from the planned cutting position C toward the lens element 21 side due to the accuracy error, the projecting section between the lens elements 2 in the bonding part, namely the ridge line portion 15 between the lens elements 21, is only somewhat lowered as shown in FIG. 7C, and there is no chance for the bonding part to be conspicuous.

Figure 7D:
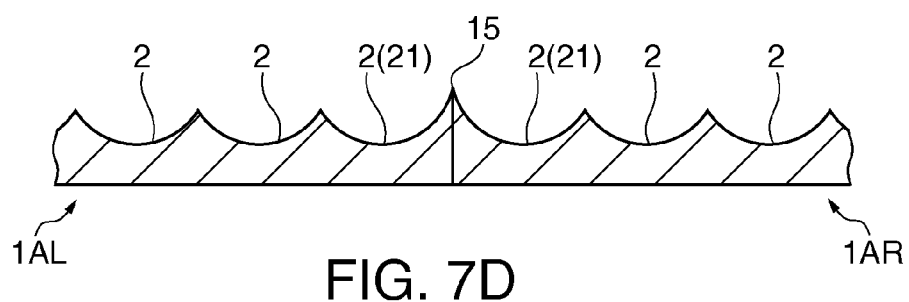

Further, even in the case in which the partial screens 1AL, 1AR are cut at a position C2 shifted from the planned cutting position C toward the lens element 20 side, since the interval A is set to be an amount larger than the sum of the interval B and the distance for tolerating the accuracy error described above as shown in FIG. 5B, the ridge line portion 15 is only somewhat raised as shown in FIG. 7D, the recessed section 93 described above is not provided to the bonding part, and there is no chance for the bonding part to be conspicuous. Therefore, the deterioration such as dazzle described above in the display image can be prevented from occurring.

It should be noted that in the case in which, for example, the interval A shown in FIG. 5B is set about 10 through 200 μm larger than the interval B, it results that the accuracy error in a range of 5 through 100 μm at most can be tolerated as the cutting amount (the range AR) on one side described above. Specifically, in the case in which the partial screens 1AL, 1AR are made of silicone resin, the accuracy error can be tolerated by setting the cutting amount to 5 through 50 μm.

According to the present embodiment explained hereinabove, the following advantages are obtained.

Since the whole screen 1A is manufactured by bonding the two partial screens 1AL, 1AR to each other, even in the case of manufacturing a large size screen, the shape of the molding die 5A for forming the screen 1A can be made smaller compared to the case of manufacturing the screen from a single die. Thus, the manufacture and the treatment of the mother die 3A and the molding die 5A can be simplified, and as a result, the manufacturing process of the screen 1A can be simplified. In particular, since the number of processes after bonding the partial screens 1AL, 1AR can be reduced, it can be made easy to manufacture the screen 1A.

Further, the manufacturing facility related to the mother die 3A and the molding die 5A and so on does not grow in size even if the screen to be manufactured grows in size, and the manufacturing cost can be suppressed. Even in the case of, for example, manufacturing a large size screen, since the mother die can be prevented from growing in size, the existing etching equipment can be used. Further, since the reflective film 12, for example, is formed before bonding, there is no need for newly introducing large size deposition equipment for forming the reflective film 12, and the existing deposition equipment can be used.

Further, since each of the partial screens 1AL, 1AR is cut along the ridge line portions 15H of the lens elements 2 having a concave shape, and the partial screens 1AL, 1AR are bonded to each other on the cutting surfaces 11A, it is possible to make it difficult to put the trace of the bonding in the lens elements 2 of the screen 1A to be manufactured. Therefore, the trace of the bonding can be made inconspicuous. Further, according to the process described above, since it becomes difficult to put the trace of the bonding in the effective reflecting area for effectively reflecting the incident light toward the observer in the screen 1A to be manufactured, the deterioration in the image to be projected and displayed on the screen 1A can be prevented.

Further, as shown in FIG. 5B, the interval A between the centers of the lens element 21 and the lens element 20 is set larger than the interval B between the centers of the lens element 21 and the lens element 22. Further, the planned cutting position C of the partial screens 1AL, 1AR are set to the position a half of the interval B distant from the lens element 21 in the direction toward the lens element 20. According to this configuration, the ridge line portion 15H is located at the position distant from the planned cutting position C in the direction from the lens element 21 toward the lens element 20 side. Thus, even in the case in which the actual cutting position is shifted toward the lens element 20 side, it can be prevented that the small lens element is formed in the bonding part as described above. Therefore, the dazzle can be prevented from occurring when displaying the image on the screen 1A, and thus the deterioration in the image can be prevented.

Further, since the cutting and the bonding are performed along the ridge line portion 15H between the lens elements 21, 20, the cutting and the bonding of the partial screens 1AL, 1AR can be performed in a linear manner. Therefore, the cutting process and the bonding process described above can be simplified. Therefore, the manufacturing process of the screen 1A can further be simplified.

Further, in the case of forming the partial screens 1AL, 1AR with a resin material, since the gap can easily be prevented from occurring in the bonding part due to the elasticity of the resin when bonding the partial screens 1AL, 1AR to each other, it can easily be prevented that the gap occurs in the bonding part of the partial screens 1AL, 1AR to thereby deteriorate the image.

Further, in the case of forming the protective film 13 on the surface 1S of the screen 1A where the lens elements 2 are formed, since the optical characteristics can be prevented from being deteriorated due to the use environmental factor, and further, the diffusion of light due to the bonding part of the partial screens 1AL, 1AR is prevented by the protective film 13, the deterioration of the image can be prevented.

Second Embodiment

Hereinafter, a second embodiment of the invention will be explained.

The screen according to the present embodiment has substantially the same function as the screen 1A described above. Here, in contrast that the screen 1A has the configuration having the plurality of lens elements each having a concave shape arranged, the screen according to the present embodiment has a configuration having a plurality of lens elements each having a convex shape arranged. The screen according to the present embodiment and the screen 1A are different from each other in this point. It should be noted that in the explanation below, the part the same or substantially the same as the part having already been explained is denoted with the same reference symbol, and the explanation therefor will be omitted.

FIGS. 8A through 8F are schematic diagrams showing a method of manufacturing the screen 1B according to the present embodiment.

Figure 8A:
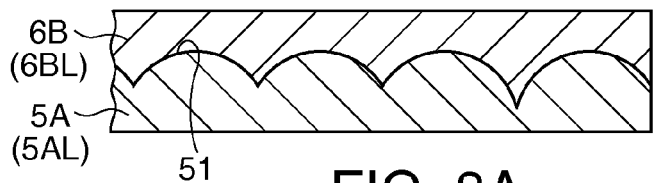
FIGS. 8A and 8B are schematic diagrams showing a final die manufacturing process in a second embodiment.
Figure 8B:
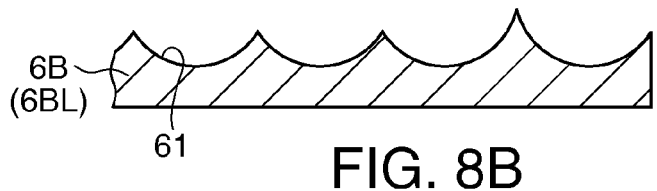
Figure 8C:
FIG. 8C is a schematic diagram showing a screen manufacturing process (a partial screen manufacturing procedure) in the embodiment.
Figure 8D:
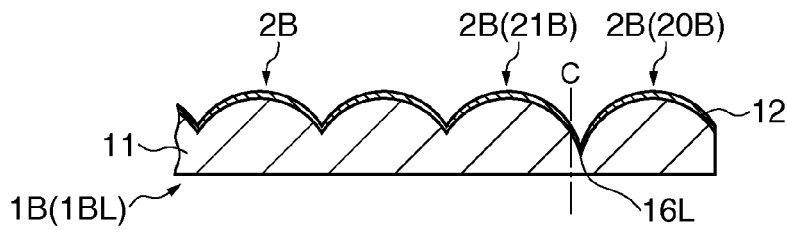
FIG. 8D is a schematic diagram showing the screen manufacturing process (a reflective film formation procedure and a cutting procedure) in the embodiment.
Figure 8E:
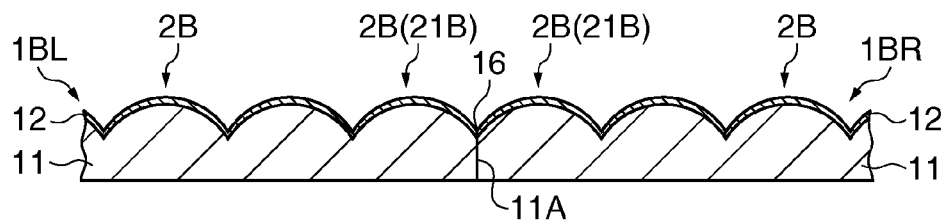
FIG. 8E is a schematic diagram showing the screen manufacturing process (a bonding procedure) in the embodiment.
Figure 8F:
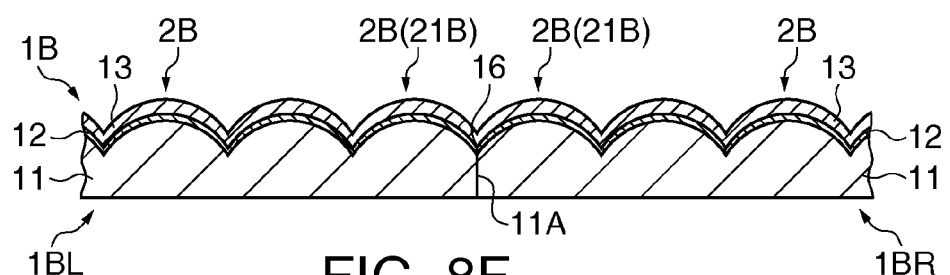
FIG. 8F is a schematic diagram showing the screen manufacturing process (a protective film formation procedure) in the embodiment.

As shown in FIG. 8F, the screen 1B according to the present embodiment has a configuration having lens elements 2B each having a convex shape arranged in the forming positions of the lens elements 2 each having the concave shape in the first embodiment in stead of the lens element 2, and reflects the incident light with the lens elements 2B to thereby display an image.

The screen 1B is manufactured by the following manufacturing method.

Specifically, by transferring the lens molds 51 of the molding die 5AL and then separating it as shown in FIG. 8A, the final die 6B (6BL) provided with the lens molds 61 each having the concave shape is manufactured as shown in FIG. 8B. It should be noted that the material of the final die 6BL can arbitrarily selected in accordance with the material of the molding die 5AL and so on, and similarly to the molding die 5AL, the final die 6BL can be formed by injecting resin such as silicone resin, besides the electrocasting of a metal material such as nickel.

Further, as shown in FIG. 8C, the lens molds 61 of the final die 6BL are transferred to the screen substrate 11, and then separated to thereby provide the lens elements 2B to the screen substrate 11. Subsequently, as shown in FIG. 8D, the reflective film 12 is formed on the surface provided with the lens elements 2B, and then the screen substrate 11 is cut at the planned cutting position C having substantially the same positional relationship as the first embodiment to thereby manufacture the partial screen 1BL. It should be noted that although the lens element 2 of the first embodiment has the concave shape, and therefore, the planned cutting position C is set along the ridge line portion 15H, the lens element 2B of the present embodiment has the convex shape, and therefore, the planned cutting position C is set along the contour portion 16L between the lens element 20B and the lens element 21B as shown in FIG. 8D. Here, the contour portion 16L (the same applies to a contour portion 16 below) denotes the most hollowing peripheral portion between the lens elements 2B each having the convex shape.

Similarly, the partial screen 1BR is also manufactured, and by bonding the partial screens 1BL, 1BR to each other as shown in FIG. 8E, and then forming the protective film 13 if necessary, the screen 1B having the lens elements 2B each having the convex shape, and the bonding part at the contour portion 16 of the lens elements 2B is manufactured as shown in FIG. 8F.

Regarding the manufacturing method of the screen 1B, the same functions and the same advantages as in the manufacturing method of the screen 1A according to the first embodiment can be obtained.

Third Embodiment

A third embodiment of the invention will hereinafter be explained with reference to the accompanying drawings.

Although the screen according to the present embodiment has substantially the same function as that of the screen 1A described above, in the manufacturing method of the screen 1A, the partial screens 1AL, 1AR are cut on the ridge line side of the lens elements 2 provided to the partial screens 1AL, 1AR. In contrast, in the manufacturing method of the screen according to the present embodiment the partial screens are cut at the bottom portions of the lens elements. The manufacturing method of the screen according to the present embodiment and the manufacturing method of the screen 1A described above are different from each other in this point. It should be noted that in the explanation below, the part the same or substantially the same as the part having already been explained is denoted with the same reference symbol, and the explanation therefor will be omitted.

Overall Configuration of Screen

Figure 9:
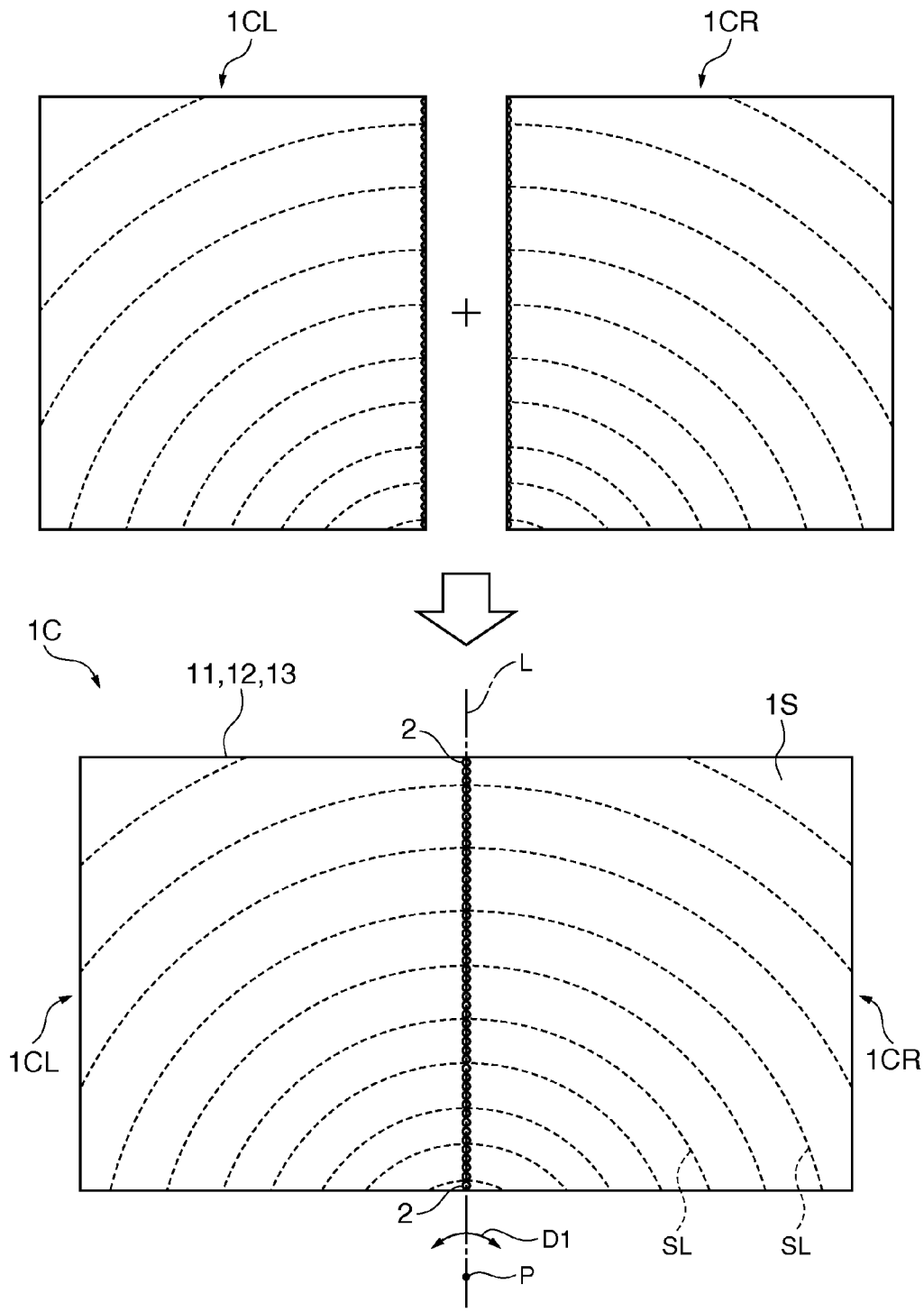
FIG. 9 is front view showing a screen according to a third embodiment of the invention.

FIG. 9 is a front view showing a configuration of a screen 1C according to the present embodiment.

As shown in FIG. 9, the screen 1C according to the present embodiment has substantially the same configuration and the same function as those of the screen 1A except the fact that it has a configuration in which the bonding part of the partial screens 1CL, 1CR passes through the bottom portion 17 (FIG. 11E) of the lens elements 2. In other words, the screen 1C is configured so that the straight line L passes through the bottom portions 17 of the lens elements 2 linearly arranged in the respective partial screens 1CL, 1CR and bonded to each other after cutting the partial screens 1CL, 1CR in the front view shown in FIG. 9.

It should be noted that the bottom portion 17 denotes the most hollowing region in the lens element 2.

Method of Manufacturing Screen

The screen 1C described above is manufactured by sequentially passing through the mother die manufacturing process, the molding die manufacturing process, and the screen manufacturing process similarly to the case of the first embodiment.

Mother Die Manufacturing Process

FIGS. 10A through 10F are schematic diagrams showing the mother die manufacturing process and the molding die manufacturing process.

Figure 10A:
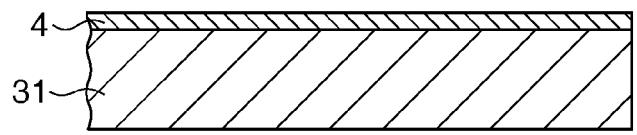
FIG. 10A is a schematic diagram showing a mother die manufacturing process (a mask formation procedure) in the embodiment.
Figure 10B:
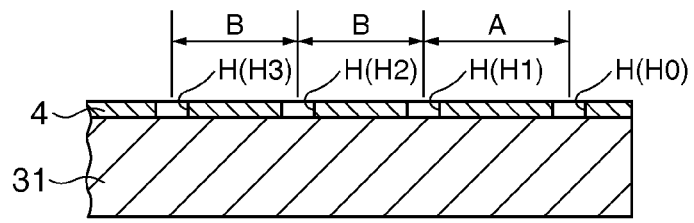
FIG. 10B is a schematic diagram showing the mother die manufacturing process (a hole formation procedure) in the embodiment.

In the mask formation procedure of the mother die manufacturing process, the mask layer 4 is provided to the material substrate 31 as shown in FIG. 10A, and in the hole formation procedure a plurality of holes H is provided to the mask layer 4 as shown in FIG. 10B. On this occasion, the center-to-center distance of the holes H0, H1 is set to the interval B in accordance with the center-to-center distance of the holes H1, H2 adjacent to each other, and the center-to-center distance of the holes H2, H3.

Figure 10C:
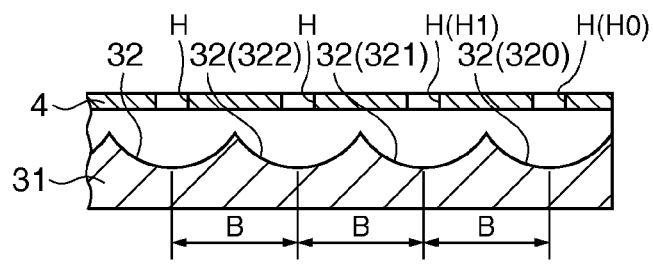
FIG. 10C is a diagram showing the mother die manufacturing process (a recess formation procedure) in the embodiment.
Figure 10D:
FIG. 10D is a diagram showing the mother die manufacturing process (an elimination procedure) in the embodiment.

In the recess formation procedure, the etching process is performed to thereby provide the lens molds 32 (the lens molds 320, 321, 322, . . . ) to the material substrate 31 as shown in FIG. 10C, and in the elimination procedure, by eliminating the mask layer 4 and so on from the material substrate 31 as shown in FIG. 10D to thereby manufacture the mother die 3C (3CL).

Molding Die Manufacturing Process

Figure 10E:
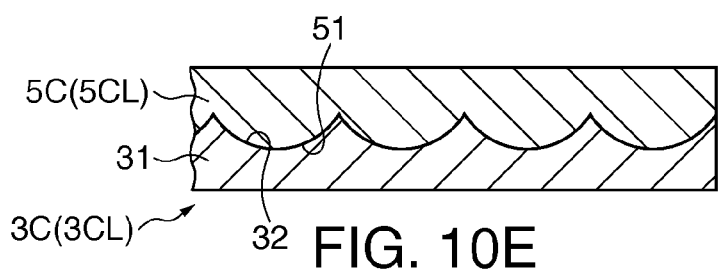
FIGS. 10E and 10F are schematic diagrams showing a molding die manufacturing process.
Figure 10F:

In the molding die manufacturing procedure, the lens molds 32 of the mother die 3C (3CL) are transferred to provide the lens molds 51 each having the convex shape to the molding die 5C (5CL) as shown in FIG. 10E, and then the molding die 5C provided with the lens molds 51 is separated from the mother die 3C to thereby manufacture the molding die 5C (5CL) shown in FIG. 10F. It should be noted that the portion corresponding to the partial screen 1CR is also manufactured in a similar manner.

Screen Manufacturing Process

FIGS. 11A through 11E are schematic diagrams showing the screen manufacturing process.

In the screen manufacturing process, when cutting the partial screens 1CL, 1CR, the cutting is performed along the bottom portions 17 of the lens elements 21.

Figure 11A:
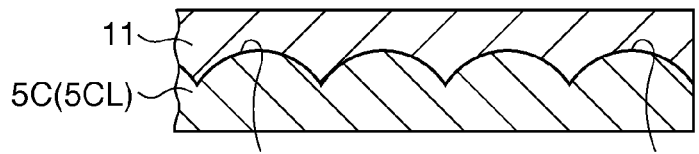
FIGS. 11A and 11B are schematic diagrams showing a screen manufacturing process (a partial screen manufacturing procedure) in the embodiment.
Figure 11B:
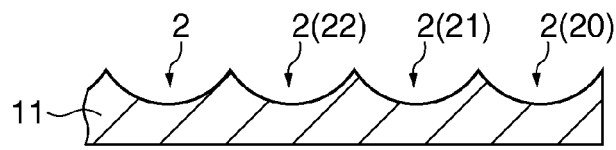

Specifically, in the partial screen manufacturing procedure, the lens molds 51 of the molding die 5CL described above are transferred to the screen substrate 11 as shown in FIG. 11A, and then the screen substrate 11 is separated therefrom to thereby provide the lens elements 2 each having the concave shape to the screen substrate 11 as shown in FIG. 11B.

Figure 11C:
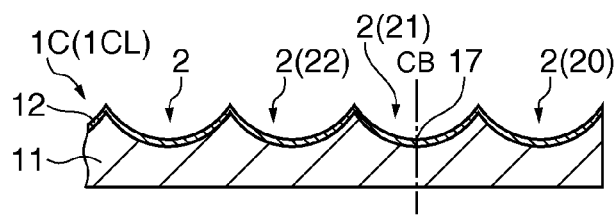
FIG. 11C is a schematic diagram showing the screen manufacturing process (a reflective film formation procedure and a cutting procedure) in the embodiment.

In the reflective film formation procedure, the reflective film 12 is formed on the surface of the screen substrate 11 provided with the lens elements 2 to thereby manufacture the partial screen 1CL, and then the partial screen 1CL thus manufactured is cut at the planned cutting position CB as shown in FIG. 11C. The partial screen 1CR is also manufactured and then cut in a similar manner. It should be noted that the planned cutting position CB is set to a position passing through the bottom portion 17 of each of the lens elements 21.

Figure 11D:
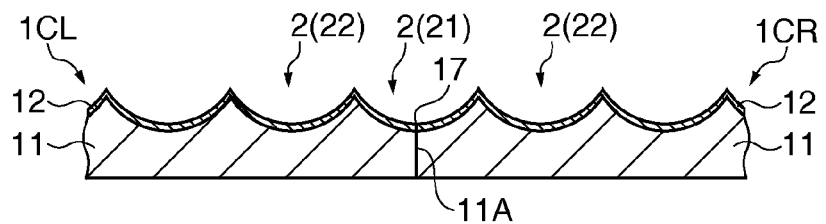
FIG. 11D is a schematic diagram showing the screen manufacturing process (a bonding procedure) in the embodiment.
Figure 11E:
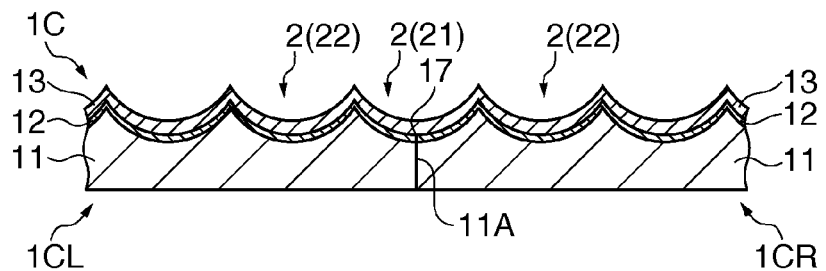
FIG. 11E is a schematic diagram showing the screen manufacturing process (a protective film formation procedure) in the embodiment.

In the bonding procedure, the partial screens 1CL, 1CR are bonded to each other on the cutting surfaces 11A as shown in FIG. 11D, and in the protective film formation procedure, the protective film 13 is formed on the entire area provided with the lens elements 2 in the partial screens 1CL, 1CR bonded to each other if necessary.

According to the process described above, there is manufactured the screen 1C having the partial screens 1CL, 1CR bonded to each other at the bottom portion 17 of each of the lens elements 2 arranged in a straight line.

According to the present embodiment explained hereinabove, the following advantages can be obtained besides the advantages described in the first embodiment.

The partial screens 1CL, 1CR are each cut at the bottom portion 17 at the smallest angle with the surfaces of the partial screens 1CL, 1CR in the lens elements 2, and then these partial screens 1CL, 1CR are bonded to each other. According to this configuration, even in the case in which the actual cutting position is shifted from the planned cutting position CB due to the accuracy error, the step can be prevented from occurring in the bonding part, and as a result, it can be prevented that the step is caused in the bonding part to thereby deteriorate the image displayed. Further, it is possible to provide a large margin with respect to the step due to the accuracy error, and thus the yield in manufacturing the screen 1C can be enhanced.

Further, since the central portion of the lens element 2 corresponds to the bottom portion 17, the distance from the planned cutting position CB to the peripheral portion of the lens element 2 can be made even and long. Therefore, there can be assured the sufficient margin for preventing that the cutting position is shifted from the planned cutting position CB and the lens element 2 adjacent thereto is cut when cutting the partial screens 1CL, 1CR.

Further, by bonding the partial screens 1CL, 1CR to each other, a part of the lens element 2 remaining in each of the partial screens 1CL, 1CR can be combined to thereby form one whole lens element 2.

Fourth Embodiment

Hereinafter, a fourth embodiment of the invention will be explained.

The screen according to the present embodiment has substantially the same function as the screen 1C described above. Here, the screen 1C is manufactured by cutting the partial screens 1CL, 1CR at the bottom portions 17 of the lens elements 2 each having the concave shape arranged in a straight line, and then bonding the partial screens 1CL, 1CR to each other on the cutting surfaces. In contrast, the screen according to the present embodiment is manufactured by cutting each of the partial screens at the top of the head of each of the lens elements each having the convex shape arranged in a straight line, and then bonding the partial screens to each other on the cutting surfaces. The screen according to the present embodiment and the screen 1C are different from each other in this point.

FIGS. 12A through 12F are schematic diagrams showing a method of manufacturing the screen 1D according to the present embodiment.

The screen 1D according to the present embodiment has substantially the same configuration and function as those of the screen 1C except the point that the lens elements 2D each having a convex shape are arranged at the forming positions of the lens elements 2 each having the concave shape in the third embodiment instead of the lens elements 2.

Figure 12A:
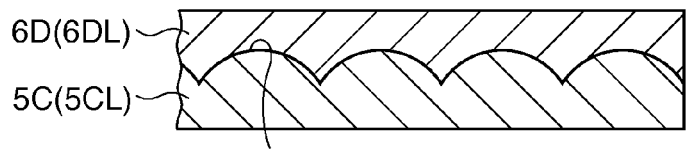
FIGS. 12A and 12B are schematic diagrams showing a final die manufacturing process in a fourth embodiment.
Figure 12B:
Figure 12C:
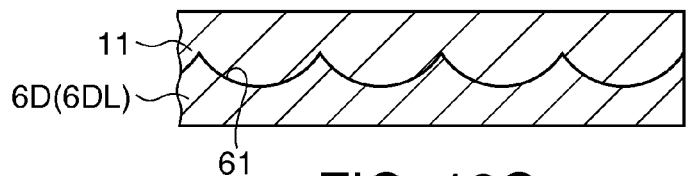
FIG. 12C is a schematic diagram showing a screen manufacturing process (a partial screen manufacturing procedure) in the embodiment.
Figure 12D:
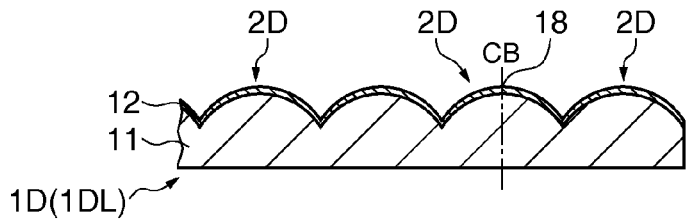
FIG. 12D is a schematic diagram showing the screen manufacturing process (a reflective film formation procedure and a cutting procedure) in the embodiment.

In the manufacturing method of the screen 1D, by transferring the lens molds 51 of the molding die 5CL and then separating it as shown in FIG. 12A, the final die 6D (6DL) provided with the lens molds 61 each having the concave shape is manufactured as shown in FIG. 12B. Subsequently, by transferring the lens molds 61 of the final die 6DL to the screen substrate 11 and then separating it as shown in FIG. 12C, the lens elements 2D each having the convex shape are provided to the screen substrate 11 as shown in FIG. 12D, and further, by forming the reflective film 12 and then cutting the screen substrate 11 at the planned cutting position CB, the partial screen 1DL is manufactured. It should be noted that although the lens elements 2 in the third embodiment each have the concave shape, and therefore, the planned cutting position CB is set to the bottom portions 17, the lens elements 2D of the present embodiment each have the convex shape, and therefore, the planned cutting position is set to the position passing through the top of the head 18 of each of the lens elements 21 as shown in FIG. 12D. Here, the top of the head 18 is the most projecting portion in the lens element 2B having the convex shape.

Figure 12E:
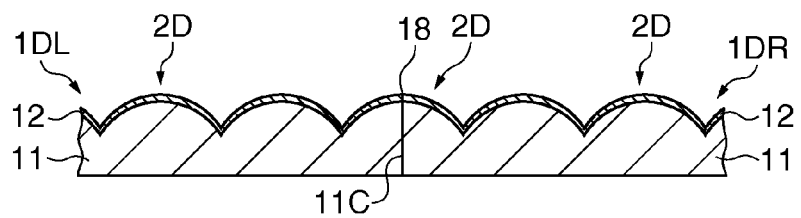
FIG. 12E is a schematic diagram showing the screen manufacturing process (a bonding procedure) in the embodiment.
Figure 12F:
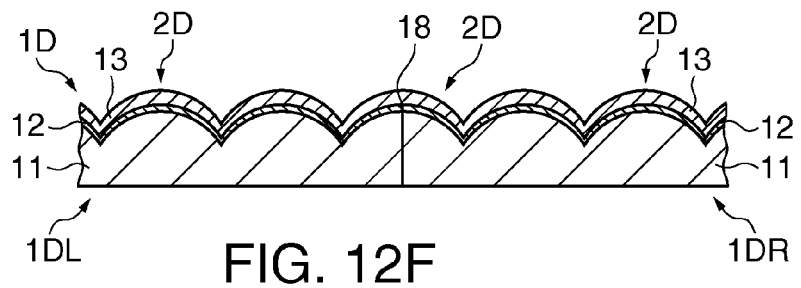
FIG. 12F is a schematic diagram showing the screen manufacturing process (a protective film formation procedure) in the embodiment.

Similarly, the partial screen 1DR is also manufactured, and by bonding the partial screens 1DL, 1DR to each other as shown in FIG. 12E, and then forming the protective film 13 if necessary, the screen 1D having the lens elements 2B each having the convex shape, and the bonding part at the top of the head 18 of each of the lens elements 2B is manufactured as shown in FIG. 12F.

Regarding the manufacturing method of the screen 1D, the same functions and the same advantages as in the manufacturing method of the screen 1C according to the third embodiment can be obtained.

Modifications of Embodiments

The invention is not limited to the embodiments described above, but includes modifications and improvements in a range where the advantages of the invention can be achieved.

Although in each of the embodiments described above, when manufacturing the screen 1A through 1D, the partial screen 1AL through 1DL forming the left side in the case of dividing the surface 1S at the center thereof in the width direction and the partial screen 1AR through 1DR forming the right side are bonded to each other, the position and the number of divisions are not limited thereto as explained below.

Figure 13:
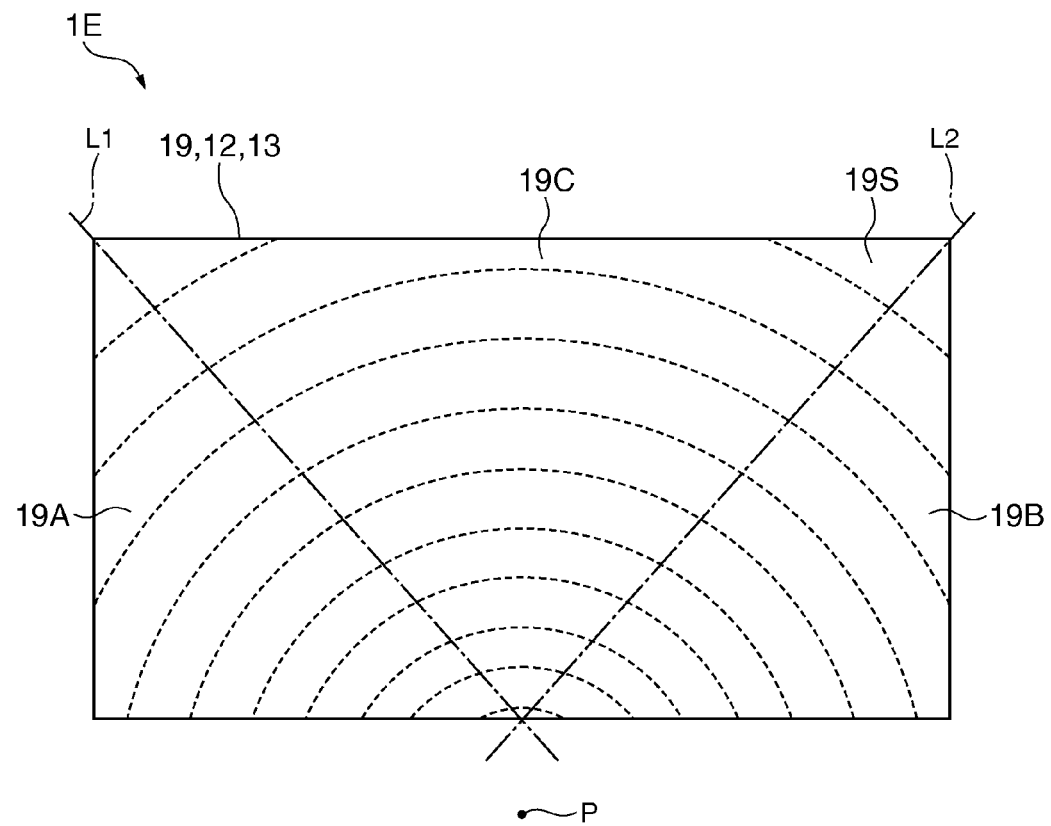
FIG. 13 is a plan view showing a screen as a modification of each of the embodiments described above.

FIG. 13 is a plan view showing a screen 1E as a modification of each of the embodiments described above.

In the screen 1E shown in FIG. 13, imaginary straight lines L1, L2 as the bonding regions of the screen 1E are set so as to respectively extend from the middle position in the width direction at the bottom of the surface 19S of the screen substrate 19 toward both of the upper corners of the screen 1E. Further, the lens elements (not shown) are linearly arranged along each of the straight lines L1, L2.

In the case of manufacturing the screen 1E, it is possible that three partial screens, namely a first partial screen 19A constituting the outer area of the straight line L1, a second partial screen 19B constituting the outer area of the straight line L2, and a third partial screen 19C constituting the area located inside the straight line L1 and inside the straight line L2, are manufactured, and then cutting and bonding are performed thereon as described above.

In the screen 1E manufactured as described above, since the bonding part is not disposed so as to divide the surface 19S at the middle position, it is possible to make the bonding part inconspicuous when viewing the screen 1E from the front.

Although in each of the embodiments described above, it is assumed that the reflective film 12 is formed prior to bonding the partial screen 1AL through 1DL and the partial screen 1AR through 1DR to each other, and the protective film 13 is formed after the bonding if necessary, the invention is not limited thereto. Specifically, the reflective film 12 can be formed after the bonding, and the protective film 13 can be formed prior to the bonding. If the formation of the reflective film 12 is performed after the bonding, the reflective film 12 can be formed at appropriate positions to the planned installation position of the projector.

Although in the first embodiment the interval A is set larger than the interval B to thereby provide the cutting amount, and then the cutting and the bonding are performed, the cutting amount can be eliminated if the cutting along the ridge line portions 15 of the lens elements 2 is possible. The same applies to the second embodiment.

Although in each of the embodiments the screen 1A through 1D is formed by bonding the partial screen 1AL through 1DL and the partial screen 1AR through 1DR to each other in a closely-attached state, the formation of the screen 1A through 1D is not limited thereto. For example, it is also possible to stack the partial screen 1AL through 1DL and the partial screen 1AR through 1DR respectively on base members such as resin films, and then bond the members to each other with an adhesive or the like while performing positioning. Thus, the size after the bonding can be controlled by controlling the gap between the partial screen 1AL through 1DL and the partial screen 1AR through 1DR or controlling the thickness dimension of the base member, and further, the positioning can accurately be performed. It should be noted that in this case, it is possible to fill the gap with an adhesive or the like.

Although in each of the embodiments described above, the lens elements 2, 2B, 2D, and the lens molds 32, 51, 61 are configured to be adjacent to each other, the invention is not limited thereto, but these can be distant from each other.

Although in the first embodiment, there is provided the explanation that it is possible to prevent that the gap is formed in the bonding part by manufacturing the partial screens 1AL, 1AR with a resin material, the method of preventing the formation of the gap is not limited thereto. For example, it is also possible to bond the partial screens 1AL, 1AR to each other with resin cured by heat, and prevent the formation of the gap due to the thermal expansion of the resin. Further, even in the case in which the projection is formed in the bonding part, the projection thus formed can be eliminated by air blow, or can be eliminated by laser ablation.

The invention can be applied as a screen for displaying an image projected by a projector or the like, and a method of manufacturing the screen.

The entire disclosure of Japanese Patent Application No. 2011-62558, filed Mar. 22, 2011 is expressly incorporated by reference herein.

What is claimed is:

1. A method of manufacturing a screen comprising:
   manufacturing a plurality of partial screens constituting the screen, and each having a plurality of lens elements arranged on a surface;
   cutting each of the partial screens; and
   bonding the partial screens to each other on cutting surfaces of the partial screens cut in the cutting,
   wherein in the manufacturing, the partial screens each having a plurality of lens elements, each having one of a concave shape and a convex shape, arranged on the surface are manufactured, and
   the cutting includes one of
   cutting each of the partial screens along a ridge line portion of the lens element as a cutting region with respect to the lens element having the concave shape, and
      cutting each of the partial screens along a contour portion of the lens element as a cutting region with respect to the lens element having the convex shape,
   wherein the partial screens are bonded to each other directly.

2. The method of manufacturing a screen according to claim 1, wherein
   the lens elements are formed adjacent to each other,
   the plurality of lens elements includes
      first lens elements, and
      second lens elements having curvature equal to curvature of the first lens elements, and disposed so as to have a center-to-center distance with adjacent one of the first lens elements longer than a center-to-center distance between two first lens elements adjacent to each other, and
   in the cutting, the cutting region is positioned between the first lens elements and the second lens elements, and the partial screens are cut at a position shifted from the cutting region toward a center of the first lens element.

3. The method of manufacturing a screen according to claim 1, wherein
   in the manufacturing, the partial screens each having a lens column including a plurality of the lens elements linearly arranged on the surface are manufactured, and
   in the cutting, the partial screens are cut at a position of the plurality of the lens elements forming the lens column.

4. A partial screen manufactured according to claim 1 and adapted to constitute a screen adapted to display an image corresponding to an incident light, comprising:
   a lens column having a plurality of lens elements each adapted to emit the light, linearly arranged on a surface.

5. A method of manufacturing a screen comprising:
   manufacturing a plurality of partial screens constituting the screen, and each having a plurality of lens elements arranged on a surface;
   cutting each of the partial screens; and
   bonding the partial screens to each other on cutting surfaces of the partial screens cut in the cutting,
   wherein in the manufacturing, the partial screens each having a plurality of lens elements, each having one of a concave shape and a convex shape, arranged on the surface are manufactured, wherein the partial screens are bonded to each other directly, and
   the cutting includes one of
      cutting each of the partial screens along a bottom portion of the lens element with respect to the lens element having the concave shape, and
      cutting each of the partial screens along a top of a head of the lens element with respect to the lens element having the convex shape.

* * * * *